United States Patent [19]

Brooks

[11] Patent Number: 4,745,263

[45] Date of Patent: May 17, 1988

[54] CURRENT REGULATOR FOR CARPET SEAMING APPARATUS

[76] Inventor: Ronald H. Brooks, 293 Nepean Highway, Edithvale, Vic. 3196, Australia

[21] Appl. No.: 731,787

[22] PCT Filed: Sep. 7, 1984

[86] PCT No.: PCT/AU84/00171

§ 371 Date: May 8, 1985

§ 102(e) Date: May 8, 1985

[87] PCT Pub. No.: WO85/01367

PCT Pub. Date: Mar. 28, 1985

[30] Foreign Application Priority Data

Sep. 9, 1983 [AU] Australia .............................. PG1337

[51] Int. Cl.[4] .............................................. H05B 1/02
[52] U.S. Cl. .................................... 219/497; 219/494; 219/549; 219/535; 219/487; 156/304.7; 156/273.9; 156/275.1
[58] Field of Search ............... 219/501, 505, 507, 528, 219/549, 485, 487, 489, 497, 535; 156/304.6, 304.7, 272.2, 273.9, 275.1, 583.7

[56] References Cited

U.S. PATENT DOCUMENTS

| | | | |
|---|---|---|---|
| 3,586,830 | 6/1971 | Leitner et al. | 219/497 |
| 4,249,068 | 2/1981 | Mangan et al. | 219/497 |
| 4,327,268 | 4/1982 | Frank | 219/497 |
| 4,346,286 | 8/1982 | Romp | 219/501 |
| 4,357,524 | 11/1982 | Apfelbeck et al. | 219/501 |
| 4,377,739 | 3/1983 | Eckert, Jr. et al. | 219/497 |
| 4,416,713 | 11/1983 | Brooks | 219/497 |

Primary Examiner—M. H. Paschall
Attorney, Agent, or Firm—Shlesinger, Arkwright & Garvey

[57] ABSTRACT

Apparatus for controlling the current flow through metal foil heating elements in carpet joining tape comprises an oscillator which produces a high frequency output to drive a power amplifier so that the output voltage to be applied to the heating element is at a frequency proportional to or the same as the oscilltor frequency. The output current (Rms) value is controlled by controlling the pulse with using a modulator which either increases or reduces the output pulse width in accordance with a comparison of the sensed output current against a reference derived from a control circuit. The reference voltage is dependent on the operating mode of the apparatus selected by switches or switch and counter.

6 Claims, 2 Drawing Sheets

CURRENT REGULATOR FOR CARPET SEAMING APPARATUS

BACKGROUND OF THE INVENTION

This invention relates to improvements in carpet seaming apparatus and relates particularly to improved apparatus for use with a carpet seaming tape or the like to produce a seam between adjacent edge portions of a carpet or other material.

In my Australian Pat. No. 529,440 and Patent Application No. 10491/83, I have described apparatus which includes means for passing a current through a strip of metal foil which is associated with or incorporated in a carpet joining tape, the apparatus having means to control the current flow through the metal foil so that heat generated thereby will act to soften an adhesive on the carpet joining tape, the apparatus further including means to hold the current flow at a selected predetermined value to maintain the adhesive in a softened condition and means selectively operated to increase the current to fully melt the adhesive.

The particular form of apparatus previously described utilized a power transformer the output of which was controlled by a Triac which, in turn, was controlled by a trigger module which sensed both the output voltage and current. A rheostat was used to vary the output voltage and current as desired.

While this apparatus functions well in most circumstances, it has been found that the weight of the apparatus is relatively high thus making it difficult to move from place to place. Further, the components of the apparatus must be completely redesigned for use on the various overseas main power systems.

SUMMARY OF THE INVENTION

It is desirable to provide improved apparatus for use in forming edge-to-edge seams in carpets or other sheet material which avoids at least some of the above disadvantages.

It is also desirable to provide an improved carpet seaming apparatus which is economical to manufacture and is relatively safe to use.

According to one aspect of the invention there is provided apparatus for use in joining abutting edges of carpet or other material using a heating element in conjunction with a joining tape having heat softenable adhesive thereon, said apparatus comprising an oscillator means having an output frequency in the range of 100 to 50,000 hertz, power output means driven by the oscillator to produce an output voltage having a frequency which is a function of the oscillator means frequency, pulse width modulator means to vary the pulse width of the output voltage to thereby vary the output current which is to be applied to the heating element, sensing means to sense the output current, control means to adjust the pulse width modulator means in accordance with sensed output current to thereby maintain a predetermined selected output current, and switch means operable to select the desired output current.

In a preferred embodiment, the power output means comprises a power amplifier which is driven by the oscillator means. The pulse width modulator means controls the width of the output pulses of the oscillator means which thereby controls the Rms value of the output current.

A differential amplifier receives a reference voltage from a reference voltage source and a signal voltage derived from the output current sensing means, which may comprise a current transformer and Rms-to-DC convertor. Any differences between the reference and signal voltages results in the differential amplifier providing an output signal to the pulse width modulator means which either increases or decreases the output current pulse width to reduce the voltage differences.

The switch means is operable to change the selected reference voltage to thereby change the selected desired output current.

According to another aspect of this invention there is provided apparatus for use in joining abutting edges of carpet or other material using a heating element in conjunction with a joining tape having heat softenable adhesive thereon, said apparatus comprising an oscillator having an output frequency of between 100 and 50,000 hertz, a pulse width modulator to adjust the pulse width of the oscillator output, a drive amplifier driven by the output of the pulse width modulator and producing an output voltage of the oscillator frequency to be applied to the heating element to cause a heating current to pass therethrough, means to sense the output current, means to adjust the pulse width modulator output in accordance with sensed output current to thereby control the output, means selectively operable to maintain a predetermined current output and further means to selectively increase the current output.

In a preferred form of this aspect of the invention, the output from the drive amplifier is applied to an output transformer, the output from the secondary of which is adapted to be connected to the heating element.

In an alternative arrangement, the output transformer may be replaced by diodes thereby producing a pulsed d.c. output current.

Preferably, the oscillator produces a square wave having a frequency of between 400 and 3,000 hertz. This output, after modulation by the pulse width modulator, drives the drive amplifier to produce an output current of the oscillator frequency.

When the high frequency output is applied to a heating element, such as a strip of foil incorporated in a carpet seaming tape, the element is heated to thereby soften adhesive on the tape. It is believed that the high frequency of the current passing through the element produces "skin-effect" heating which enables the adhesive to be heated relatively rapidly. When the element has heated to a temperature sufficient to soften the adhesive, a switch is operated whereby the output current is reduced and is maintained at a level sufficient to maintain the element at the adhesive softening temperature for a period of time sufficient to enable the abutting edges of the carpet to be properly aligned on the tape in the manner described in my aforesaid Australian Patent. The adhesive, at this time, is in a tacky condition which enables the carpet edge portions to be properly adjusted. On completion of adjustment, a switch is actuated whereby the current flow is increased to thereby increase the temperature of the element and thus fully melt the adhesive whereby, on rolling, the adhesive flows into the carpet backing which, it has been found, produces a secure, water-proof and shampoo-proof seam. A timer may be used to switch off the current flow after a predetermined time to prevent overheating of the seaming tape element.

The means to sense the output current and to enable the current to be maintained at a level sufficient to maintain the temperature of the heating element may comprise a current transformer in the output circuit which provides a signal to the pulse with modulator. The signal is used to adjust the pulse width of the drive and wave form into the drive amplifier. Therefore, if for example, as a result of cooling of the heating element, the output current is sensed to change, due to the change in foil resistance, the feedback circuit senses that change and makes appropriate adjustment to the output current to maintain the desired heating element temperature.

The apparatus of the present invention is relatively light in weight as compared to previous apparatus due largely to the absence of a power transformer designed to operate at normal supply frequencies. The apparatus of the present invention also has a higher duty cycle as compared to previous apparatus, the full current output being able to be maintained indefinitely. Further, the present invention is relatively simply adapted for use with the various power supplies of overseas countries.

In order that the invention is more readily understood, two embodiments thereof will be described with reference to the accompanying drawings.

DESCRIPTION OF PREFERRED EMBODIMENTS

Figure 1:
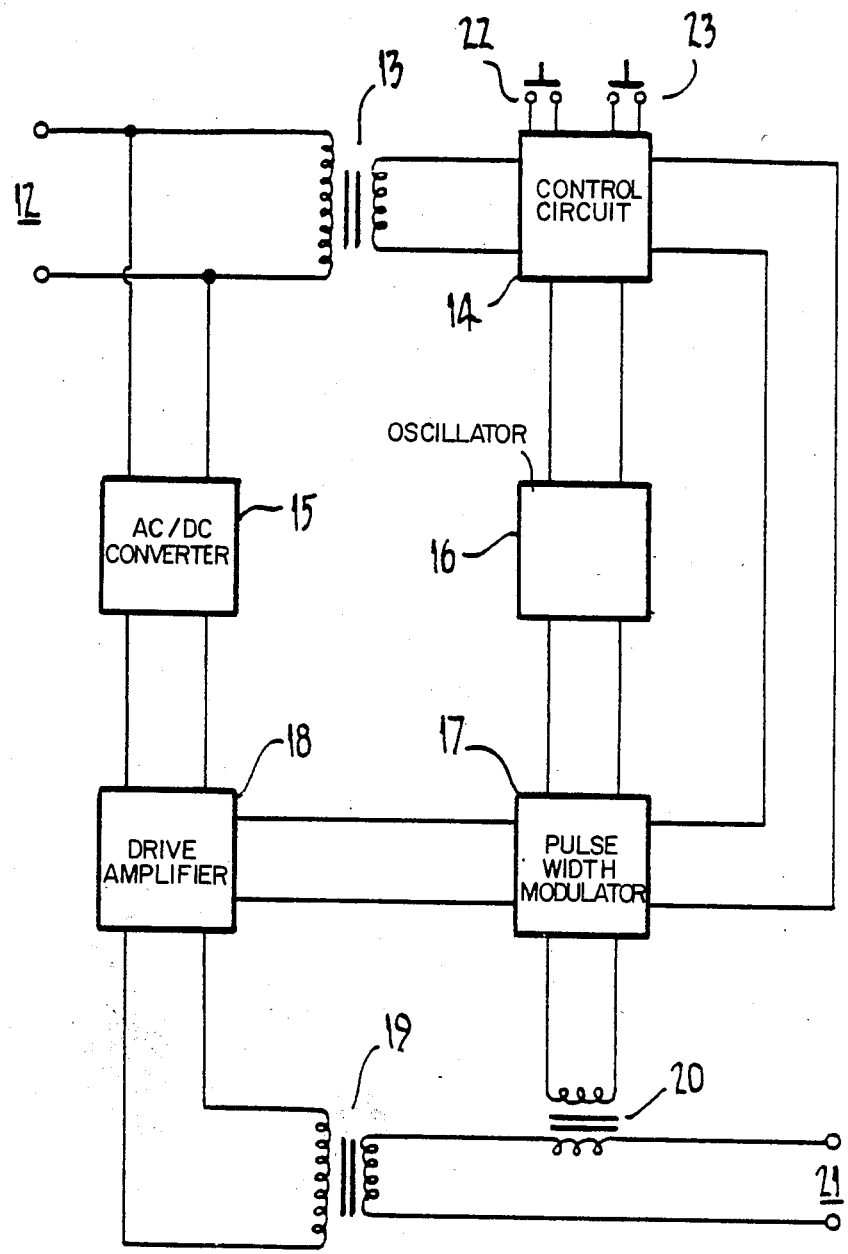
FIG. 1 is a block diagram of one embodiment of the invention.

Referring to FIG. 1, the input 12 is adapted to be connected to a conventional power outlet which, in Australia, is of 240 volts at 50 Htz with a rated output of 10 amps. The mains supply is transformed by the relatively small transformer 13 to provide 20 volts for operation of the control circuitry. The main supply is also applied to an A.C./D.C. converter 15, the D.C. output of which passes to a drive amplifier 18.

The control circuitry comprises an operating control circuit 14, an oscillator 16 producing an output voltage having a frequency of about 1000 Hertz, and a pulse width modulator 17. The output from the pulse width modulator 17 is used to drive the drive amplifier 18 to produce an output voltage of the oscillator frequency which passes through a relatively small output transformer 19 to output terminals 21. A current transformer 20 senses output current, this information being fed back to the pulse width modulator 17.

In use, the input 12 is connected to mains power and the output terminals 21 are connected to a strip of metal foil in a carpet seaming tape. The mains power is converted by the converters 15 to a D.C. current which is fed to the drive amplifier 18. The oscillator 16 produces a square wave output and the pulse width of this is controlled by the pulse width modulator 17 which drives the drive amplifier 18.

In a first operating mode, such as, for example, when the apparatus output is first connected to the metal foil and actuated, the control circuit 14 provides a signal to the pulse width modulator whereby the oscillator output pulses are modulated to a predetermined maximum width so that the output current from the drive amplifier 18 is a predetermined maximum.

The current transformer 20 senses the output current flowing and causes the pulse width modulator 17 to increase or decrease the pulse width in order to maintain the predetermined value in accordance with the control circuit signal.

When the foil temperature rises sufficiently to just soften the adhesive on the carpet joining tape, the push button 22 is actuated and the control circuit 14 switches to a "HOLD" mode. In this mode, the signal provided by the control circuit 14 reduces the pulse width of the oscillator output pulses so that the output current is accordingly reduced to a predetermined level, which is sufficient to maintain the foil temperature. During this time, the edges of the carpet being joined can be adjusted. On completion of adjustments, the push button 23 is actuated to increase the current flowing through the foil to thereby fully melt the adhesive. When the adhesive has melted, the apparatus is electrically disconnected from the foil so that no further current flows therethrough.

During the "hold" mode, any loss or increase of temperature of the foil is reflected in a change in the current flowing, due to a change of resistance. This change is compensated by the current transformer 17 and pulse width modulator.

If desired, a timer may be incorporated in the control circuit to switch off the apparatus a predetermined time after the button 23 has been actuated. Further, ambient temperature compensation may be incorporated into the control circuit to vary the output during the "hold" phase in accordance with variations in sensed ambient temperature. Thus, if the apparatus is being used in direct sunlight or on outdoor carpet or other material, the output during the "hold" phase is reduced as heat losses from the heating element i.e. the foil, will also be reduced as compared to such losses when the apparatus is used in a relatively cold ambient temperature.

In the past, prior apparatus sometimes incorporated a timer which controlled the heating cycle and turned off the current before the element became too hot. However, such apparatus did not operate correctly in cold ambient temperatures or hot temperatures as the current was switched off either before the adhesive became fully melted or after the carpet overheated and burnt or deteriorated. The present invention can incorporate the compensating means in conjunction with the timer to lengthen or shorten the "heat" cycle in accordance with the ambient temperature so that the current is cut off at the correct adhesive condition. An audible and/or visual alarm can be included to indicate to the operator that the seam is ready to roll.

In a modified arrangement, a further control switch may be provided in the control circuit to enable manual selection of a lower output in the "hold" phase if the operator determines that the normal output is resulting in too great a temperature of the foil. This situation may occur where the length of the seam is relatively short and the resistance of the heating element is accordingly lower.

Figure 2:
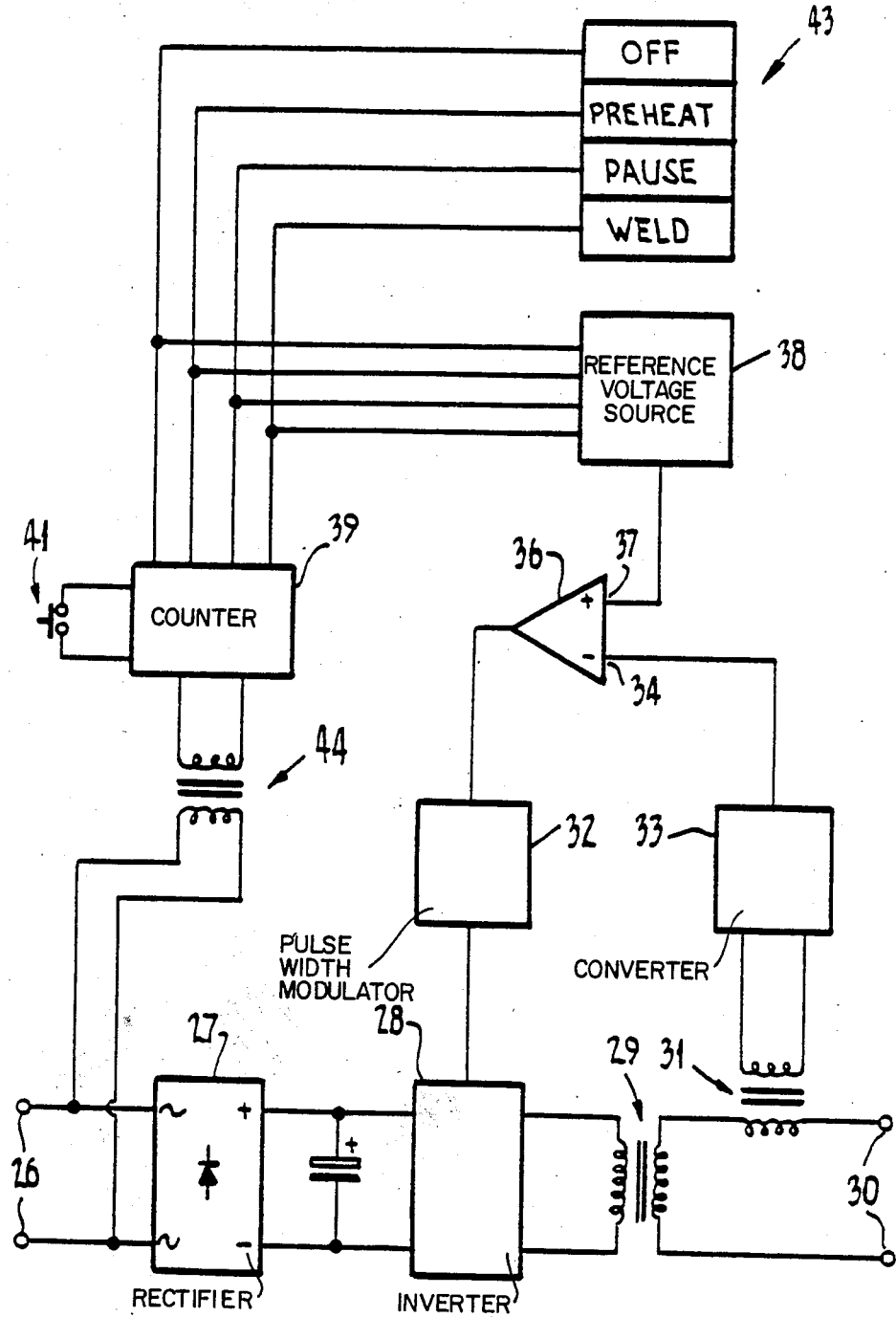
FIG. 2 is a block diagram of a second embodiment of the invention.

Referring to FIG. 2 of the drawings, a modified form of the invention is illustrated schematically. In this embodiment, the input voltage applied to input terminals 26 is rectified and filtered in the rectifier 27 to provide a D.C. output voltage of approximately 300 volts. This voltage is applied to the inverter 28 which incorporates an oscillator circuit and a power amplifier stage.

The output of the inverter 28 is approximately 300 V (Rms) of a frequency the same as or proportional to the oscillator frequency. Preferably, the output voltage frequency is about 4000 Hertz, although this can vary in accordance with other design requirements within the range of 400 Hertz to 50 K Hertz, depending on the proposed application of the apparatus.

A relatively small output transformer 29 (compared to a 50 Hertz transformer) reduces the output voltage to about 60 V at the output terminals 30.

The pulse width of the output current, and therefore the Rms value of the output current, is controlled by the pulse width modulator 32 to increase or decrease the Rms output current in accordance with the current sensed by the current transformer 31 compared with a predetermined reference. An Rms to D.C. converter 33 takes the current transformer 31 output to produce a D.C. signal proportional to the Rms value. This signal is fed to the inverting input 34 of the differential amplifier 36. A reference voltage is applied to the non-inverting input 37 of the differential amplifier 36 so that the output therefrom is a function of the difference between the inputs 34 and 37. This difference signal applied to the pulse width modulator 32 causes an increase or decrease of output current pulse width necessary to reduce the difference signal to zero.

The reference voltage applied to the differential amplifier input 37 is derived from the reference voltage source 38 which receives inputs from counter 39. A selector switch 41 initiates the counter 39 to sequentially switch between four operating modes, including an OFF mode. In the OFF mode, the reference voltage source 38 produces a zero output signal to the differential amplifier and, hence, the output current is zero.

Actuation of the selector switch 41 steps the counter 39 to the PRE-HEAT mode whereby the reference voltage applied to the differential amplifier 36 causes heating current to flow through the metal foil to which the output terminals 30 are connected. The maximum Rms value of output current is controlled by the monitoring current transformer 31, the Rms to D.C. converter 33 and differential amplifier 36.

When the heating element (metal foil) has reached the desired temperature, i.e. when the adhesive on the carpet joining tape becomes tacky, the selector switch 41 steps the counter to the PAUSE mode. In this mode, the reference voltage is reduced to a predetermined level which adjusts the pulse width modulator to reduce the output current to a level which is predetermined to be sufficient to maintain the adhesive in the tacky condition. In this embodiment, the reference voltage and, hence the output current is reduced to about 70% of that in the PRE-HEAT mode, although this can be varied in any particular form of apparatus depending on its application. Manual variation may, if desired, be incorporated in the reference voltage source.

After appropriate adjustment of the carpet seam, a further actuation of the selector switch 41 steps the counter 39 to the WELD mode in which the output current is increased to fully melt the adhesive and form the seam, as described in my earlir patent and patent application aforesaid. Either an inbuilt timer or actuation of the selector switch 41 steps the counter back to the OFF setting.

A mode display 43 provides a visual indication of the operating mode status of the apparatus. An audible alarm may also be incorporated into the counter 39 and associated with the timer to give an audible alarm after predetermined time periods after initiation of the PRE-HEAT and WELD modes so that overheating can be avoided.

The control circuitry comprising the counter 39, reference voltage source 38, pulse width modulator 32 and Rms to D.C. converter 33 derives power from the transformer 44.

In this embodiment the high frequency output current derived from the inverter 28 enables rapid and controlled heating of the metal foil heating element, whether that element is incorporated in a carpet seaming tape or comprises the seaming/unseaming tape described in my International Patent Application No. PCT/AU82/00222.

Ambient temperature compensation is incorporated into the reference voltage source 38 to take account of operating conditions, as decribed in the previous embodiment.

The apparatus of the invention may be modified in accordance with the design parameters referred to above and in accordance with latest developments in the art of electrical control circuitry. Such modifications may include the provision of filters to remove mains spikes, the use of integrated circuitry in the control circuit programmed to vary the oscillator output, the pulse width modulator and/or the output power amplifier in accordance with sensed, measured or manually set input data to control the output to that which is optimum for each operation. Thus, the control circuits may include an impedance measuring function which, when the input of the apparatus is connected to the heating element, measures the impedance thereof and controls the heating operation in accordance with that measured impedance. Other preprogrammed control functions which may be incorporated into the apparatus of the invention include preprogramming a microprocessor to take account of known foil heating parameters to automatically control the heating currents and time, given the seam length.

I claim:

1. Apparatus for use in joining abutting edges of carpet or other material using a resistive heating element in conjunction with a joining tape, the joining tape having a heat softenable adhesive thereon, said apparatus comprising power input means to be connected to an A.C. mains power source, an oscillator means having an output frequency in the range of 100 to 50,000 Hertz, power output means driven by the oscillator to produce an A.C. or pulsed D.C. output voltage having a frequency which is a function of the oscillator means frequency, said power output means including an amplifier means receiving a control signal from a pulse width modulator to vary the pulse width of the oscillator means output which varies both the pulse width of the output voltage and the Rms value of output current which is applied to the heating element, current sensing means to sense the Rms value of output current, control means to adjust the pulse width modulator means in accordance with sensed output current to mainstain a predetermined selected output current, and switch means operable to select the desired output current, the switch means having a first operational mode in which the output voltage applied to the heating element has a frequency and a pulse width to cause the Rms value of the output current to be at a first predetermined value at which heating of the heating element occurs and a second operational mode in which the pulse width is reduced to reduce the Rms value of the output current to a value which maintains the heating element at a desired temperature.

2. Apparatus according to claim 1 wherein the output voltage frequency is between 400 and 5000 Hertz.

3. Apparatus according to claim 1 wherein the output frequency is about 3000 Hertz.

4. Apparatus according to any one of the preceding claims wherein the pulse width modulator means varies the pulse width of the oscillator output to thereby effect a corresponding variation of the output current.

5. The apparatus for use in joining abutting edges of carpet or other material as set forth in claim 1, wherein said current sensing means comprises a current transformer in the output circuit.

6. The apparatus for use in joining abutting edges of carpet or other material as set forth in claim 1, wherein said control means comprises a reference voltage source, switch means to select a desired reference voltage, and comparator means to compare the sensed output current with the selected reference voltage.

* * * * *